US008855911B2

(12) United States Patent
Ma et al.

(10) Patent No.: US 8,855,911 B2
(45) Date of Patent: Oct. 7, 2014

(54) SYSTEMS AND METHODS FOR NAVIGATION USING CROSS CORRELATION ON EVIDENCE GRIDS

(75) Inventors: Yunqian Ma, Plymouth, MN (US); John B. McKitterick, Columbia, MD (US); Wesley J. Hawkinson, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 672 days.

(21) Appl. No.: 12/963,893

(22) Filed: Dec. 9, 2010

(65) Prior Publication Data

US 2012/0150441 A1 Jun. 14, 2012

(51) Int. Cl.
*G01C 21/16* (2006.01)
*G01S 5/16* (2006.01)
*G01S 5/02* (2010.01)

(52) U.S. Cl.
CPC ............ *G01S 5/0252* (2013.01); *G01S 5/16* (2013.01); *G01S 5/0263* (2013.01)
USPC ........... 701/400; 701/408; 701/409; 701/500; 701/510

(58) Field of Classification Search
CPC ..... G01S 5/16; G01S 5/0252; G01S 5/02563; G01C 21/16
USPC ......... 701/400, 408, 409, 445, 454, 455, 466, 701/467, 469, 482, 500, 505, 509, 510, 532, 701/533
See application file for complete search history.

(56) References Cited

U.S. PATENT DOCUMENTS

| 5,045,860 A | 9/1991 | Hodson |
| 5,087,916 A | 2/1992 | Metzdorff et al. |

(Continued)

FOREIGN PATENT DOCUMENTS

| GB | 2162014 | 1/1986 |
| WO | 2007028932 | 3/2007 |

OTHER PUBLICATIONS

European Patent Office, "Communication under Rule 71(3) EPC", "from Foreign Counterpart of U.S. Appl. No. 12/963,893", filed Feb. 15, 2013, pp. 1-29, Published in: EP.

(Continued)

*Primary Examiner* — Jason Holloway
*Assistant Examiner* — Rachid Bendidi
(74) *Attorney, Agent, or Firm* — Fogg & Powers LLC (57) ABSTRACT

Systems and methods for navigation using cross correlation on evidence grids are provided. In one embodiment, a system for using cross-correlated evidence grids to acquire navigation information comprises: a navigation processor coupled to an inertial measurement unit, the navigation processor configured to generate a navigation solution; a sensor configured to scan an environment; an evidence grid creator coupled to the sensor and the navigation processor, wherein the evidence grid creator is configured to generate a current evidence grid based on data received from the sensor and the navigation solution; a correlator configured to correlate the current evidence grid against a historical evidence grid stored in a memory to produce displacement information; and where the navigation processor receives correction data derived from correlation of evidence grids and adjusts the navigation solution based on the correction data.

20 Claims, 6 Drawing Sheets

(56) References Cited

U.S. PATENT DOCUMENTS

| | | | |
|---|---|---|---|
| 5,257,347 A * | 10/1993 | Busbridge et al. ............ | 345/649 |
| 5,563,513 A | 10/1996 | Tasci et al. | |
| 5,596,659 A | 1/1997 | Normile et al. | |
| 5,649,030 A | 7/1997 | Normile et al. | |
| 5,755,400 A | 5/1998 | Kalms, III | |
| 5,822,465 A | 10/1998 | Normile et al. | |
| 5,878,373 A * | 3/1999 | Cohen et al. .................... | 702/22 |
| 6,218,980 B1 | 4/2001 | Goebel et al. | |
| 6,282,362 B1 * | 8/2001 | Murphy et al. .............. | 386/224 |
| 6,389,354 B1 * | 5/2002 | Hicks et al. ................... | 701/514 |
| 6,400,313 B1 * | 6/2002 | Morici et al. ................. | 342/176 |
| 6,912,464 B1 | 6/2005 | Parker | |
| 7,446,766 B2 * | 11/2008 | Moravec ....................... | 345/424 |
| 7,584,020 B2 * | 9/2009 | Bruemmer et al. ........... | 700/245 |
| 7,719,664 B1 | 5/2010 | Flowers | |
| 8,427,472 B2 * | 4/2013 | Moravec ....................... | 345/420 |
| 8,463,036 B1 | 6/2013 | Ramesh et al. | |
| 2002/0147544 A1 * | 10/2002 | Nicosia et al. ................ | 701/207 |
| 2002/0181762 A1 | 12/2002 | Silber | |
| 2004/0145496 A1 | 7/2004 | Ellis | |
| 2004/0167717 A1 | 8/2004 | Buchanan et al. | |
| 2004/0178945 A1 | 9/2004 | Buchanan | |
| 2006/0044431 A1 | 3/2006 | Ovsiannikov | |
| 2006/0125680 A1 | 6/2006 | Thackray | |
| 2006/0157639 A1 | 7/2006 | Shaffer et al. | |
| 2006/0178828 A1 * | 8/2006 | Moravec ....................... | 701/211 |
| 2007/0046448 A1 | 3/2007 | Smitherman | |
| 2008/0009966 A1 * | 1/2008 | Bruemmer et al. ........... | 700/245 |
| 2008/0035834 A1 | 2/2008 | Gleckler | |
| 2008/0086236 A1 | 4/2008 | Saito et al. | |
| 2008/0100822 A1 | 5/2008 | Munro | |
| 2008/0103699 A1 | 5/2008 | Hanna et al. | |
| 2008/0169964 A1 * | 7/2008 | Hawkinson ..................... | 342/64 |
| 2008/0181487 A1 * | 7/2008 | Hsu et al. ....................... | 382/154 |
| 2008/0231504 A1 | 9/2008 | Sartor et al. | |
| 2008/0232709 A1 | 9/2008 | Rahmes et al. | |
| 2008/0234981 A1 | 9/2008 | Sartor et al. | |
| 2008/0273752 A1 | 11/2008 | Zhu et al. | |
| 2009/0103779 A1 | 4/2009 | Loehlein et al. | |
| 2009/0119010 A1 * | 5/2009 | Moravec ....................... | 701/209 |
| 2009/0238473 A1 | 9/2009 | McKitterick | |
| 2009/0322742 A1 | 12/2009 | Muktinutalapati et al. | |
| 2010/0017060 A1 | 1/2010 | Zhang et al. | |
| 2010/0063730 A1 | 3/2010 | Case et al. | |
| 2011/0026837 A1 | 2/2011 | Kita | |
| 2011/0060478 A1 | 3/2011 | Nickolaou | |
| 2011/0069175 A1 | 3/2011 | Mistretta et al. | |
| 2011/0243476 A1 | 10/2011 | Sieracki | |
| 2011/0254833 A1 | 10/2011 | McDaniel et al. | |
| 2012/0150441 A1 | 6/2012 | Ma et al. | |
| 2013/0131984 A1 | 5/2013 | Elgersma et al. | |
| 2014/0025331 A1 | 1/2014 | Ma et al. | |

OTHER PUBLICATIONS

Kulich et al., "Robust Data Fusion With Occupancy Grid", "IEEE Transactions on Systems, Man and Cybernetics: Part C: Applications and Reviews", Feb. 1, 2005, pp. 106-115, vol. 35, No. 1, Publisher: IEEE Service Center.

Gerlek, "Compressing Lidar Data", "Photogrammetric Engineering & Remote Sensing", Nov. 2009, pp. 1253-1255.

Nieto, "Scan-SLAM: Combining EKF-SLAM and Scan Correlation", "Proceedings of International Conference on Field and Service Robotics", Jul. 2005, pp. 1-12.

Alfano et al., "Capacity of MIMO Channels with One-sided Correlation", "ISSSTA2004", Aug. 30-Sep. 2, 2004, pp. 515-519, Publisher: IEEE, Published in: AU.

Delmarco et al., "Application of a Dynamic Feature Selection Algorithm to Multi-Sensor Image Registration", Apr. 9, 2007, pp. 1-12, vol. 6567, No. 17.

European Patent Office, "European Search Report", mailed Jun. 28, 2012, Published in: EP.

Novak, "Correlation Algorithms for Radar Map Matching", "IEEE Transactions on Aerospace and Electronic Systems", Jul. 1978, pp. 641-648, vol. AES-14, No. 4, Publisher: IEEE.

Novak, "Radar Detection and Map-Matching Algorithm Studies", "IEEE Transactions on Aerospace and Electronic Systems", Sep. 1980, pp. 620-625, vol. AES16, No. 5, Publisher: IEEE.

Elgersma et al., "Rapid Lidar Image Correlation for Ground Navigation", "U.S. Appl. No. 13/302,831", Nov. 22, 2011, pp. 1-63.

Ma et al., "Systems and Methods for Correlating Reduced Evidence Grids", "U.S. Appl. No. 13/552,174, filed Jul. 18, 2012",, pp. 1-40.

European Patent Office, "Office Action", "from Foreign Counterpart of U.S. Application ", Sep. 5, 2012, pp. 1-5, Published in: EP.

U.S. Patent and Trademark Office, "Office Action", "U.S. Appl. No. 13/302,831", Apr. 1, 2013, pp. 1-34.

U.S. Patent and Trademark Office, "Office Action", "U.S. Appl. No. 13/302,831", Jul. 18, 2013, pp. 1-27.

European Patent Office, "Office Action from EP Application No. 12192885.7 mailed Oct. 1, 2013", "from Foreign Counterpart of U.S. Appl. No. 13/302,831", filed Oct. 1, 2013, pp. 1-6, Published in: EP.

European Patent Office, "European Search Report from EP Application No. 12192885.7 mailed Sep. 11, 2013", "from Foreign Counterpart of U.S. Appl. No. 13/302,831", filed Sep. 11, 2013, pp. 1-3, Published in: EP.

U.S. Patent and Trademark Office, "Notice of Allowance", "from U.S. Appl. No. 13/302,831", Nov. 18, 2013, pp. 1-11, Published in: US.

European Patent Office, "Office Action from EP Application No. 13175604.1 mailed Nov. 26, 2013", "from Foreign Counterpart of U.S. Appl. No. 13/552,174", filed Nov. 26, 2013, pp. 1-7, Published in: EP.

European Patent Office, "European Search Report from EP Application No. 13175604.1 mailed Nov. 4, 2013", "from Foreign Counterpart of U.S. Appl. No. 13/552,174", filed Nov. 4, 2013, pp. 1-4, Published in: EP.

Elfes, "Using Occupancy Grids for Mobile Robot Perception and Navigation", Jun. 1989, pp. 46-57, Publisher: IEEE.

Martin et al., "Robot Evidence Grids", Mar. 1996, pp. 1-48, Publisher: Carnegie Mellon University, Published in: US.

U.S. Patent and Trademark Office, "Notice of Allowance", "from U.S. Appl. No. 13/302,831", May 8, 2014, pp. 1-9, Published in: US.

* cited by examiner

SYSTEMS AND METHODS FOR NAVIGATION USING CROSS CORRELATION ON EVIDENCE GRIDS

BACKGROUND

A navigation system uses an inertial measurement unit (IMU) to create a navigation solution. The IMU measures accelerations and turn rates, and a computing element integrates them over time to determine the position and attitude of an object. However, as an object travels for an extended period of time, errors in the measurements may arise and accumulate, causing the calculated position of the object to "drift" away from the object's true position. To correct these errors, external systems, like a global positioning system (GPS), can be used to provide correcting information. Nevertheless, signals from GPS or other external systems are unavailable in certain locations. Feature based navigation performed locally on a navigation system is one such method for acquiring information to correct drifting where correction information from external systems is unavailable.

Feature-based navigation systems acquire navigation information by detecting the positions of features within the environment of the object, and by relating changes in those positions to changes in position and attitude. For example, high resolution sensors can accurately detect the position of features within an environment by identifying specific, distinct features. A feature-based navigation system navigates by comparing the relative location of the identified features between frames. Some environments, such as non-structured natural environments, may not contain distinct features. In an environment with non-distinct features, feature-based navigation systems are unable to identify features. Further, other environments contain obscurants that block high frequency energy. The blocking of the high frequency energy causes high frequency, high resolution sensing systems to fail. While a sensor that emits low frequency energy can penetrate obscurants to resolve an image, the resultant images have low resolution and normal feature-based navigation methods are ineffective.

For the reasons stated above and for other reasons stated below which will become apparent to those skilled in the art upon reading and understanding the specification, there is a need in the art for improved systems and methods for navigation.

SUMMARY

The embodiments of the present invention provide systems and methods for navigation using cross correlation on evidence grids and will be understood by reading and studying the following specification.

In one embodiment, a system for using cross-correlated evidence grids to acquire navigation information comprises: a navigation processor coupled to an inertial measurement unit, the navigation processor configured to generate a navigation solution; a sensor configured to scan an environment; an evidence grid creator coupled to the sensor and the navigation processor, wherein the evidence grid creator is configured to generate a current evidence grid based on data received from the sensor and the navigation solution; a correlator configured to correlate the current evidence grid against a historical evidence grid stored in a memory to produce displacement information; and where the navigation processor receives correction data derived from correlation of evidence grids and adjusts the navigation solution based on the correction data.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the present disclosure may be practiced. These embodiments are described in sufficient detail to enable those skilled in the art to practice the present disclosure, and it is to be understood that other embodiments may be utilized and that logical, mechanical, electrical, and method changes may be made without departing from the scope of the present disclosure. The following detailed description is, therefore, not to be taken in a limiting sense. Further, the various sections of this specification are not intended to be read in isolation but considered together with the teachings of the written description as a whole.

With embodiments of the present invention, measurement of the navigation state errors, based on correlation of sensor data with an evidence grid, are provided to a Kalman filter, which estimates and corrects errors in the navigation solution. As will be described in greater detail below, in one embodiment, data obtained from a sensor over a short period of time (for example, one second) is combined with a current navigation solution to create an evidence grid. The three-dimensional evidence grid is a collection of cells or voxels, each with an associated probability that the cell is occupied by a feature. Essentially, the evidence grid is a two or three-dimensional map that is created from the sensor measurements. The evidence grid created from the most recent sensor data is denoted as the current sensor scan (CSS). Further, an additional evidence grid is created from sensor data collected prior to the most recent sensor data. This additional evidence grid is denoted as the historical evidence grid. Using a three-dimensional cross correlation between the CSS and the historical evidence grid, embodiments of the present invention can then estimate navigation errors and generate corrections for the position and attitude provided in the navigation solution. Further details regarding evidence grids can be found in U.S. Patent Publication 2009/0238473, published Sep. 24, 2009, which is herein incorporated by reference.

Figure 1:
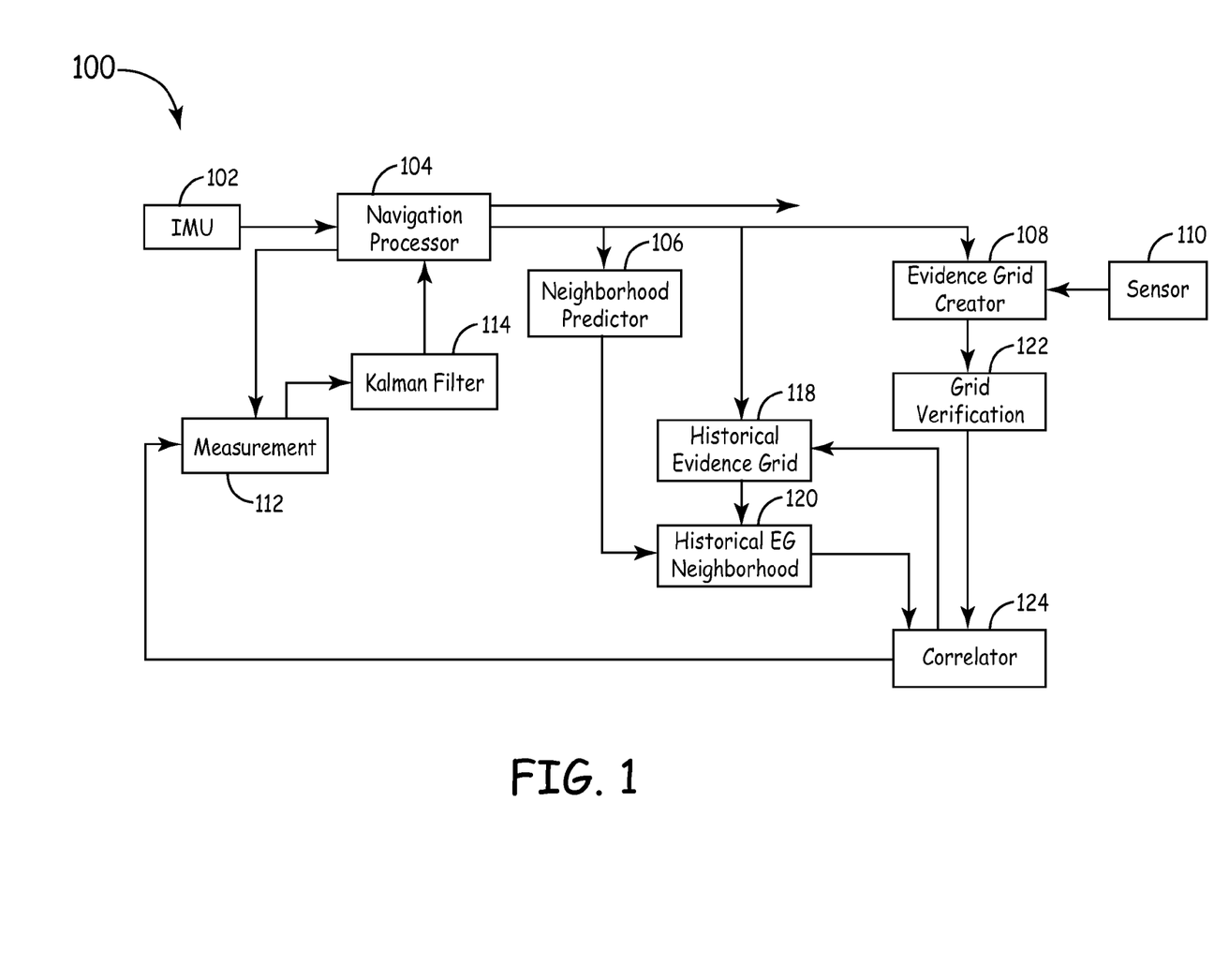
FIG. 1 is a block diagram of one embodiment of the present invention.

FIG. 1 is a diagram of an exemplary navigation system 100 for using cross correlation of evidence grids to ensure accuracy of navigation solutions. Navigation system 100 comprises an IMU 102 that outputs one or more channels of inertial motion data to a navigation processor 104 that outputs a navigation solution. Navigation system 100 further comprises Kalman filter 114 which supplies correction data for Navigation processor 104 derived from the correlation of evidence grids, as further discussed below.

IMU 102 is a sensor device configured to sense motion and to output data corresponding to the sensed motion. In one embodiment, IMU 102 comprises a set of 3-axis gyroscopes and accelerometers that determine information about motion in any of six degrees of freedom (that is, lateral motion in three perpendicular axes and rotation about three perpendicular axes).

The phrase "navigation processor," as used herein, generally refers to an apparatus for calculating a navigation solution by processing the motion information received from IMU 102. A navigation solution contains information about the position, velocity, and attitude of the object at a particular time.

In one embodiment, in operation, IMU 102 senses inertial changes in motion and transmits the inertial motion information as a signal or a plurality of signals to a navigation processor 104. In one example, navigation processor 104 applies dead reckoning calculations to the inertial motion information to calculate and output the navigation solution. In another example, navigation processor 104 uses differential equations that describe the navigation state of IMU 102 based on the sensed accelerations and rates available from accelerometers and gyroscopes respectively. Navigation processor 104 then integrates the differential equations to develop a navigation solution. During operation of IMU 102, errors arise in the movement information transmitted from IMU 102 to navigation processor 104. For example, errors may arise due to misalignment, nonorthogonality, scale factor errors, asymmetry, noise, and the like. As navigation processor 104 uses the process of integration to calculate the navigation solution, the effect of the errors received from IMU 102 accumulate and cause the accuracy of the reported navigation solution to drift away from the objects actual position, velocity, and attitude. To correct errors and prevent the further accumulation of errors, navigation processor 104 receives correction data from Kalman filter 114. The inputs to Kalman filter 114 are provided by navigation processor 104 and a correlator's estimate of the position and attitude of the sensed environment, which is derived from the correlation of evidence grids. For the embodiment shown in FIG. 1, both the current and historical evidence grids are generated by Evidence Grid Creator 108. Evidence Grid Creator 108 receives at least a portion of the navigation solution generated by navigation processor 104 and is further coupled to a sensor 110. The term "sensor," as used herein, refers to sensors that are capable of resolving external objects as a collection of voxels. Examples of sensors include stereo cameras, flash LADARS, scanning LIDARS, RADARS, and SONARS. In one embodiment, sensor 110 is a type of sensor that provides a range measurement at a known azimuth and elevation. This enables the identification of voxels and the construction of the evidence grids discussed below.

As mentioned above, an evidence grid is a two or three dimensional matrix of cells where, in at least one embodiment, the cells are marked as either occupied or unoccupied to represent physical features in an environment. To create an evidence grid, sensor 110 scans the surrounding environment. For some embodiments, sensor 110 actively senses its environment by emitting and receiving energy, such as, by using light detection and ranging (LIDAR), RADAR, SONAR, ultrasonic acoustics, and the like to measure the range and angles from sensor 110 to objects in the environment. Alternatively, in other embodiments, sensor 110 passively senses the environment such as by using a stereoscopic camera or other device that receives ambient energy from the environment and determines the range and angles from sensor 110 to objects in the environment. Sensor 110 scans the environment to gather information about features that exist in the environment for a determined period of time. Scans can comprise a single full scan of the environment or comprise multiple scans of the environment collected over several seconds. After sensing the environment, sensor 110 transmits the gathered information to evidence grid creator 108. Evidence grid creator 108 uses the gathered information received from sensor 110 to construct an evidence grid representing the scanned environment while it uses the data contained in the navigation solution to determine an orientation of the evidence grid with respect to a predetermined frame of reference.

Figure 2:
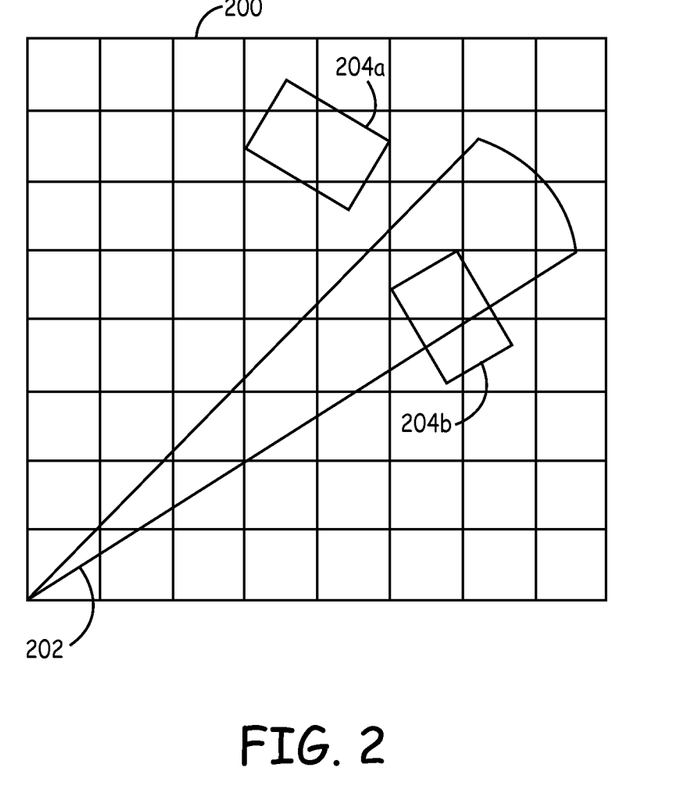
FIG. 2 is a diagram illustrating a two-dimensional evidence grid of one embodiment of the present invention.

FIG. 2 is an illustrative example of a current evidence grid 200 created by evidence grid creator 108 for one embodiment of the present invention. In the creation of current evidence grid 200, sensor 110 scans 202 the environment to sense the locations of features 204a and 204b by receiving energy that has reflected off of features 204a and 204b. Sensor 110 then transmits the gathered information to evidence grid creator 108. Evidence grid creator 108 uses the navigation solution received from navigation processor 104 concerning position, attitude and time, in conjunction with the data from sensor 110 to then orient current evidence grid 200 within a reference frame. Evidence grid creator 108 determines the relative positions of features 204a and 204b with reference to navigation system 100's reference frame and indicates which voxels within current evidence grid 200 are occupied by features 204a and 204b. In one embodiment, the method to indicate which voxels (cells) are occupied by features 204a and 204b is based on binary encoding. That is, a zero would indicate that the cell is empty of a feature while a one would indicate that the cell is occupied by a feature, for example. Alternately, the method used to indicate which voxels are occupied is based on a probabilistic encoding. That is, for each cell a probability value is assigned that indicates the probability that the cell is occupied by a feature. In still other embodiments, a combination of binary and probabalistic encoding is utilized.

Figure 3:
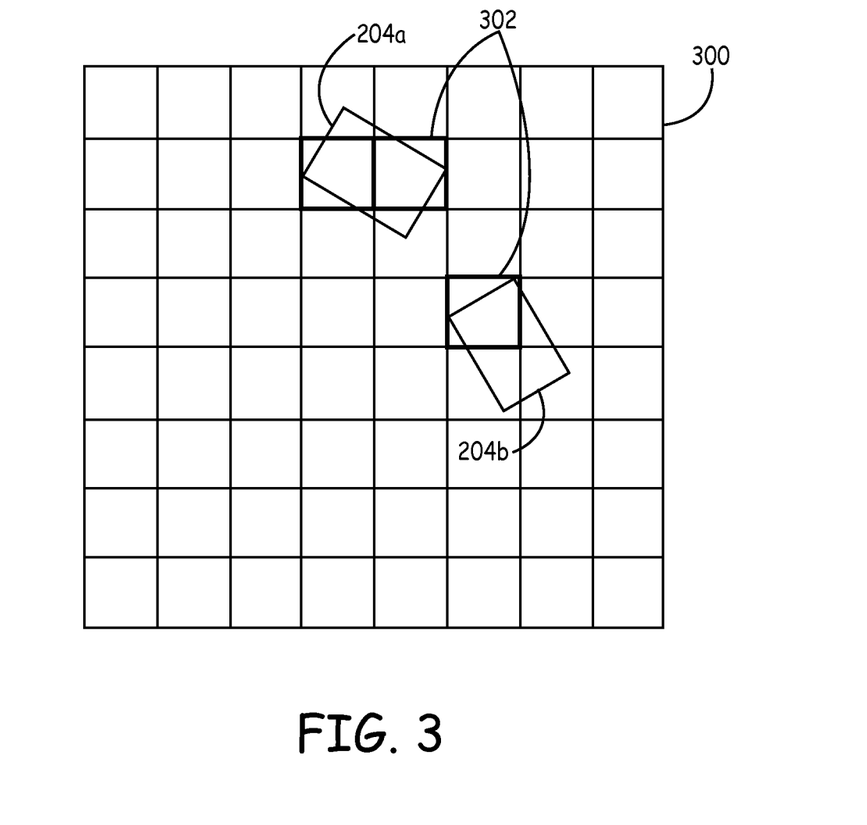
FIG. 3 is a diagram illustrating a two-dimensional evidence grid with binary encoded voxels of one embodiment of the present invention.

FIG. 3 is an exemplary embodiment of a current evidence grid 300 with the locations of features 204a and 204b indicated by occupied binary encoded voxels 302. For the embodiment shown in FIG. 2, current evidence grid 300 is represented as current evidence grid 200. Evidence grid creator 108 encodes the locations of features 204a and 204b by locating them within a voxel of current evidence grid 300. For the voxels containing features 204a and 204b, evidence grid creator 108 marks those voxels as occupied.

In one embodiment, where the data received from sensor 110 is itself probabilistic in nature, evidence grid creator 108 marks a voxel as occupied when the probability of occupancy, based on the data from image sensor 110, exceeds a threshold probability. For example, in one embodiment evidence grid creator 108 will mark voxels as occupied when they have a probability of occupancy exceeding fifty percent.

Figure 4:
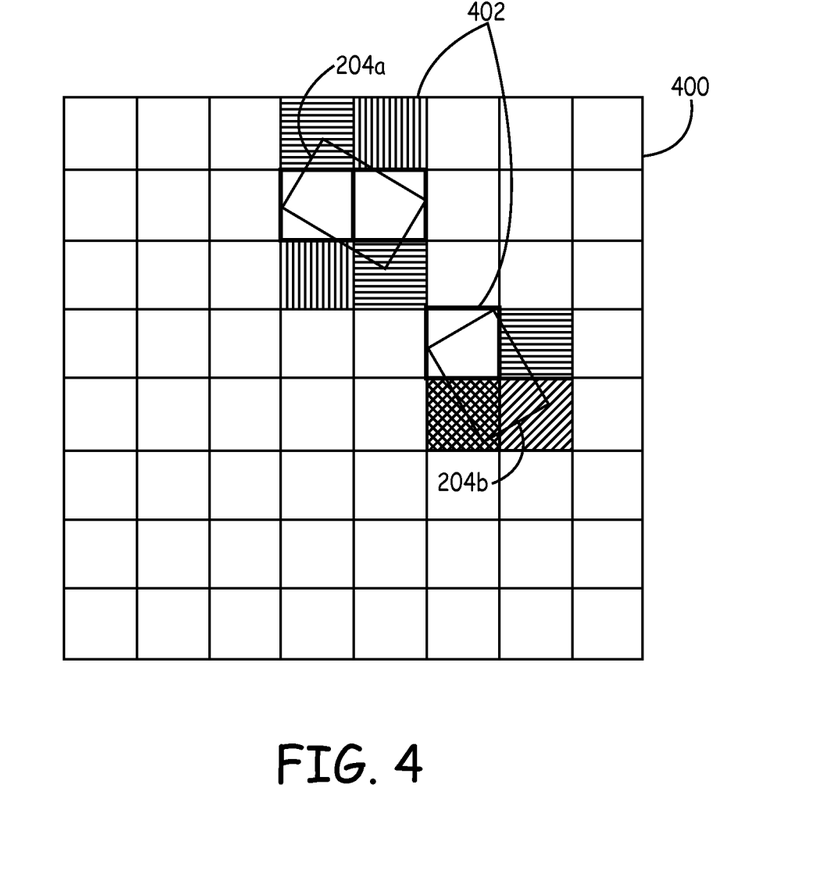
FIG. 4 is a diagram illustrating a two-dimensional evidence grid with probabilistically encoded voxels of one embodiment of the present invention.

In contrast to a binary encoding of current evidence grid 300, FIG. 4 illustrates an example of a current evidence grid 400 where the locations of features 204a and 204b are indicated by probabilistic encoded voxels 402. Evidence grid creator 108 indicates the location of features 204a and 204b within current evidence grid 400 by encoding a particular voxel with a probability of occupancy. For example, a first voxel has a probability of occupancy of twenty-five percent; a second voxel has a probability of occupancy of seventy-five percent. The probability encoded voxels 402 have different values assigned to an individual voxel indicating its associated probability of occupancy. In FIG. 4, the different probabilities of occupancy are represented by different hatching patterns in the occupied probabilistic encoded voxels 402 within current evidence grid 400.

As would be appreciated by one of ordinary skill in the art upon reading this specification, the decision as to whether to use a binary encoding or a probabilistic encoding depends on the application and processing abilities of navigation system 100 in FIG. 1. For example, probabilistic encoding, while more accurately representing a sensed environment than binary encoding, requires more memory and faster processors than binary encoding. Therefore, in a navigation system 100 that needs higher accuracy, an evidence grid stores data about features with a probabilistic encoding. Conversely, in a navigation system where the processing and memory are limited or faster processing speed is desired, an evidence grid stores data about features with a binary encoding. In a further embodiment, the voxel size determines whether a navigation system encodes the positions of features with a binary encoding or a probabilistic encoding. Where the voxel size is large, a navigation system encodes the position of features with a probabilistic encoding. Equally, where the voxel size is small, a navigation system encodes the position of features within an evidence grid using a binary encoding.

Referring back to FIG. 1, navigation system 100 further comprises grid verification function 122. After generating an evidence grid, evidence grid creator 108 provides the current evidence grid to evidence grid verification 122 to determine if the current evidence grid accurately represents the surrounding environment by applying one or more validity checks to the signal received from sensor 110 to determine that the signal represents a scan of the environment and not a scan of noise. In one embodiment, when a faulty evidence grid is indicated, evidence grid verification 122 will ignore the received data and await reception of another evidence grid from evidence grid creator 108. If the validity checks indicate that the current evidence grid represents a valid scanned environment, then evidence grid creator 108 transmits the current evidence grid to correlator 124.

In the embodiment shown in FIG. 1, correlator 124 receives the current evidence grid from grid verification 122. Correlator 124 is further coupled to a memory 126 that stores one or more historical evidence grids (shown at 118). The phrase "historical evidence grid," as used herein, generally refers to an evidence grid that was constructed before the current evidence grid just generated by Evidence Grid Creator 108.

The function of correlator 124 is to correlate the features found in the current evidence grid against features identified in one or more historical evidence grids. In one embodiment, upon performing this correlation, the current evidence grid is saved into the historical evidence grid memory 118 to serve as a historical evidence grid for the next iteration. For each iteration, the inputs to create the current evidence grid are the navigation solution data and the sensor 110 data collected over a period of time. By calculating the correlation of the current evidence grid with the historical evidence grid across a search space consisting of translations and rotations, correlator 124 can determine the best match between the two evidence grids and directly determine the navigation errors which can be used to reset the inertial navigation solution using Kalman filter 114. In one embodiment, the historical evidence grid comprises a cumulative evidence grid that combines all of the sensor data and navigation data (and navigation corrections) from not only the current period of time, but also prior periods.

The cross-correlation between the two evidence grids, the current evidence grid and the historical evidence grid, is accomplished in one of several ways. In one embodiment each cell in the evidence grids stores the probability that the cell is occupied. In the current evidence grid, this probability is based on the sensor and navigation data from the most recent period in time. In the historical evidence grid, this probability is based on prior sensor and navigation data. To do the correlation, correlator 124 performs rotations and/or translations of the current evidence grid by an amount corresponding to a potential navigation correction. Because the cells of the transformed current evidence grid will not necessarily align with the cells in the historical evidence grid, correlator 124 will perform an interpolation on the current sensor scan cells to calculate the cross-correlation. One very simple method of interpolation is just to move the cells in the current sensor scan to the location of the nearest cell in the historical evidence grid. Then the cross-correlation can be calculated in several ways. One method is the binary method, in which the cells are declared to be either occupied or unoccupied, depending on whether the probability of occupancy is above or below some threshold. Then the value of the cross-correlation at the cell level is a 1 if the state of occupancy of the cell in the historical evidence grid matches the state of occupancy of the cell in the current evidence grid, and a 0 otherwise. The total summation of the values at the cell level is then the binary cross-correlation between the two grids. Another method uses the probabilities of occupancy directly, by assigning the value of the cross-correlation at the cell level to be $1-(\theta_c-\theta_h)^2$, where $\theta_c$ is the probability of occupancy for the cell in the current sensor scan, and $\theta_h$ is the probability of occupancy for the associated cell in the historical evidence grid. The total summation of the values at the cell level is then the probability-based cross-correlation between the two grids. Noteworthy in the cross-correlation calculations is that correlator 124 can use not only the information about which cells are occupied, but also the information about which cells are known to be not occupied. Because the cross-correlation results will be maximized when the two grids most closely align, the problem reduces to an optimization problem over the six degrees of freedom in the navigation corrections.

Figure 5:
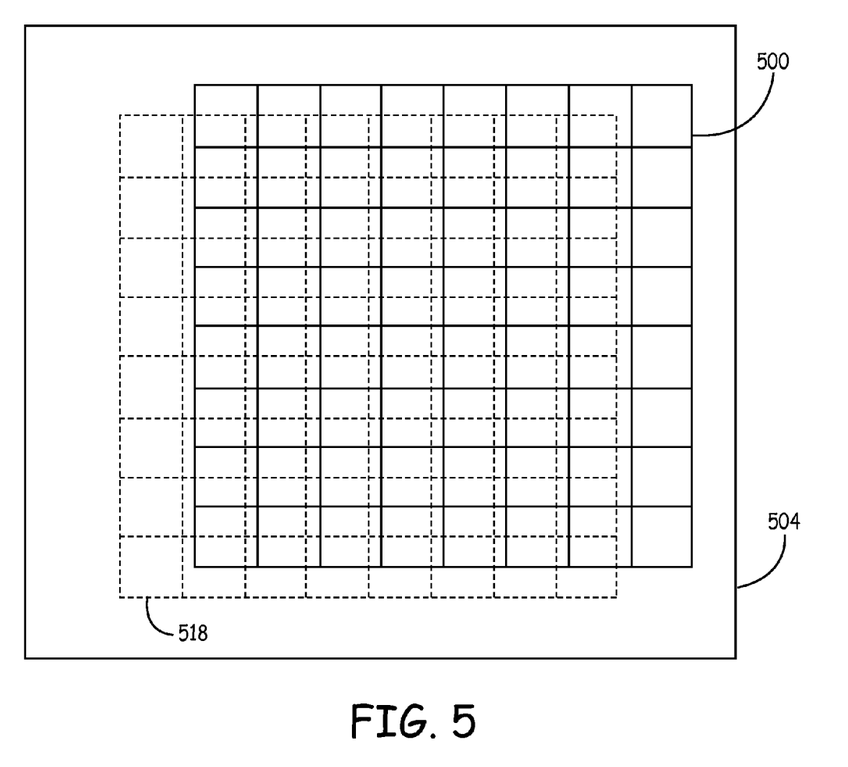
FIG. 5 is a diagram illustrating a neighborhood of one embodiment of the present invention.

FIG. 5 illustrates an example where a current evidence grid 500 is correlated with a historical evidence grid 518 within a neighborhood 504. To find the matching position for current evidence grid 500 in relation to historical evidence grid 518, the data stored in current evidence grid 500 and the data stored in historical evidence grid 518 is translated and/or rotated until the data stored in current evidence grid 500 and the data stored in historical evidence grid 518 are similar, meaning that their correlation value exceeds a predetermined threshold. In one embodiment, correlator 124 in FIG. 1 translates the data stored in current evidence grid 500 and the data stored in historical evidence grid 518 both laterally and rotationally through the six degrees of freedom. In at least one embodiment, current evidence grid 500 and historical evidence grid 518 are considered to be in a matching position when the data stored in current evidence grid 500 and the data stored in historical evidence grid 518 are maximally correlated.

In one embodiment, the concept of an evidence grid neighborhood is introduced. Utilizing an evidence grid neighborhood increases the efficiency of the translation and rotation of the evidence grids by limiting correlator 124 to a defined translational and rotational range in which to translate and rotate the data stored in the current evidence grid and the historical evidence grid. Referring to FIG. 5, a neighborhood 504 is a region defined by a neighborhood predictor 106 that uses navigation solution information from navigation processor 104 with a probability space encompassing the possible errors that are introduced into the navigation solution by the IMU 102. Using the navigation solution, and the probability space of possible errors, neighborhood predictor 106 forms a neighborhood of possible evidence grid translations and rotations through which correlator 124 can translate and rotate the current evidence grid and the historical evidence grid data saved at 118. By combining this information with the historical evidence grid data saved at 118, an historical evidence grid neighborhood is formed and saved (shown at 120) which provides a neighborhood of possible evidence grid translations and rotations through which correlator 124 translates and rotates the data stored in the current evidence grid. That is, the historical evidence grid neighborhood 120 combines the data from neighborhood predictor 106 with historical evidence grid 118 to create a restricted range of possible translations and rotations represented by neighborhood 504. Correlator 124 restricts the translations and rotations of the current evidence grid to translations and rotations within neighborhood 504.

In one embodiment, correlator 124 saves the translations and rotations made to align the current evidence grid with the historical evidence grid in a translation and rotation record and transmits the translation and rotation record to measurement function 112. For example, the translation and rotation record will represent that a translation or rotation of the current evidence grid through certain distances in the x, y and z-axis and a rotation through certain angles was performed during correlation. After recording the translations and rotations in the translation and rotation record, correlator 124 sends the translation and rotation record to measurement function 112.

Measurement function 112 uses the translation and rotation record in conjunction with the navigation solution from navigation processor 104, and the historical evidence grid stored at 118 to identify any error that was introduced into the navigation solution during the operation of navigation system 100. For example, assume that after saving the historical evidence grid, IMU 102 introduces an error that causes the navigation solution to shift laterally. After the introduction of the error into the navigation solution, navigation system 100 performs a scan of the environment, and evidence grid creator 108 constructs a new current evidence grid. After evidence grid creator 108 constructs the new current evidence grid, correlator 124 translates and rotates the data stored in the new current evidence grid to correlate with the data stored in a historical evidence grid (which was constructed before the error was introduced into the navigation solution). The translations and rotations made to the data will correspond to the introduced error. Correlator 124 then transmits a translation and rotation record to measurement function 112. Measurement function 112 combines the information from correlator 124 with information from navigation processor 104. Measurement function 112 then uses the combined information to update Kalman filter 114 and correct the errors that were introduced into the navigation solution.

Figure 6:
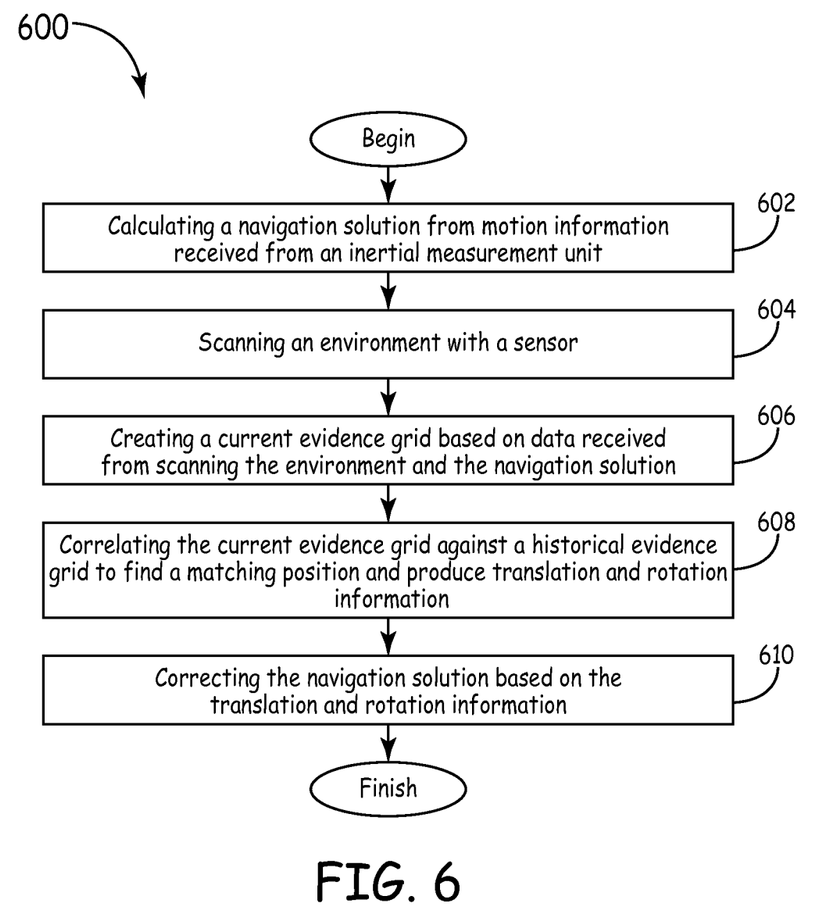
FIG. 6 is a flowchart illustrating a method of one embodiment of the present invention.

FIG. 6 is a flow chart illustrating an exemplary method 600 for correlating evidence grids to remove errors introduced into a navigational solution. In one embodiment, method 600 is performed by elements of navigation system 100 discussed above. Method 600 begins at 602 calculating a navigation solution from motion information received from an inertial measurement unit. For example, an IMU senses motion using a series of gyroscopes and accelerometers and then transmits the sensed motion information to a navigation processor. After the navigation processor receives the motion information from the IMU, the navigation processor calculates a navigation solution using the motion information. For instance, a navigation processor uses the motion information and a previously known position to calculate a navigation solution, which includes the current position, velocity, and attitude of the object being guided by the navigation system. The navigation solution can then guide the navigation of the object. The navigation processor also updates the navigation solution at a high frequency rate, such as 100 Hz, for example.

Method 600 proceeds at 604 with scanning an environment with a sensor. For example, in one embodiment a sensor (such as sensor 110, for example) scans an environment to acquire information about features to aid the navigation processor in constructing an accurate navigation solution. Method 600 continues at 606 with creating a current evidence grid based on data received from scanning the environment and the navigation solution. For instance, in one embodiment an evidence grid creator (such as evidence grid creator 108) creates a current evidence grid based on the data received from a sensor and the navigation solution received from the navigation processor. In at least one example, the evidence grid creator creates the current evidence grid based on information received from multiple scans of the environment. Further, in alternate embodiments, the evidence grid creator encodes the information received from the sensor using a binary representation of the sensed environment or by using a probabilistic representation of the sensed environment, or a combination of both encodings. The evidence grid creator updates the current evidence grid at a low frequency rate, such as 2 Hz, for example.

After the identification of a neighborhood, method 600 proceeds at 608 with correlating the current evidence grid against a historical evidence grid to find a matching position and produce translation and rotation information (i.e., displacement information). In one embodiment, the translation and rotation information can optionally be stored as a displacement record. In one embodiment, the method further optionally includes identifying a neighborhood of possible evidence grid translations and rotations. For instance, a neighborhood predictor can be used to define a range of values through which data stored in the current evidence grid and the data stored in the historical evidence grid can be translated or rotated.

In one embodiment, a correlator translates and rotates the data stored in the current evidence grid and the data stored in the historical evidence grid until the data stored in the current evidence grid and the data stored in the historical evidence grid are similar. In other words, the correlator translates and rotates the data stored in the current evidence grid and the data stored in the historical evidence grid such that the data stored in the two evidence grids are maximally correlated. In one embodiment where a neighborhood is utilized, the correlator translates and rotates the data stored in the current evidence grid and the data stored in the historical evidence grid within the neighborhood. After the data in the evidence grids is translated and rotated, method 600 proceeds with the creation of a translation and rotation record. For example, the correlator records the translations and rotations made to the data stored in the current evidence grid and the data stored in the historical evidence grid in a displacement record, where the translations and rotations were made to find the matching position.

Method 600 proceeds at 610 with correcting the navigation solution based on the translation and rotation information. In one embodiment, correcting the navigation solution comprises updating a Kalman filter with information derived from the translation and rotation information (which in one embodiment would be stored in a displacement record). For example, a correlator (such as correlator 124 in FIG. 1) transmits the acquired displacement record to a Kalman filter (such as Kalman filter 114). As the translation and rotation record contains information regarding navigational changes that occurred before the creation of the current evidence grid but after the creation of the historical evidence grid, the Kalman filter uses the data to update the navigation solution. Method 600 is performed iteratively to check for and correct any other errors that may arise. For example, the current evidence grid is stored as a new historical evidence grid, the evidence grid creator creates a new current evidence grid, and the correlator adjusts data stored in the new evidence grid and data stored in the new historical evidence grid to find a new matching position. By iterating, the correlation of the evidence grid provides a check against errors that arise during the operation of an IMU.

Several means are available to implement the systems and methods of the current invention as discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to, computer-executable instructions executed by computer system processors and hardware description languages such as Very High Speed Integrated Circuit (VHSIC) Hardware Description Language (VHDL).

This description is presented for purposes of illustration, and is not intended to be exhaustive or limited to the embodiments disclosed. Variations and modifications may occur, which fall within the scope of the following claims. For example, the embodiments above relate to a navigation system, but it is understood that any variation or species of navigation system can utilize the described invention. Furthermore, some of the components described below may be implemented using either digital or analog circuitry, or a combination of both.

What is claimed is:

1. A method for acquiring navigation information, the method comprising:
    calculating a navigation solution, with a navigation processor, from motion information received from an inertial measurement unit;
    scanning an environment with a sensor;
    creating a current evidence grid based on data received from scanning the environment and the navigation solution, wherein an evidence grid represents the environment with a collection of cells, where each cell has a probability that an associated location in the environment is occupied by a feature;
    correlating the current evidence grid against a historical evidence grid to find a matching position and produce displacement information, wherein correlating the current evidence grid against a historical evidence grid comprises performing one or more translations or rotations to align the current evidence grid and the historical evidence grid; and
    correcting the navigation solution based on the displacement information.

2. The method of claim 1, wherein correcting the navigation solution further comprises:
    updating a Kalman filter with information derived from the displacement information.

3. The method of claim 1, wherein creating a current evidence grid further comprises marking voxels of the current evidence grid to represent features of the environment captured by the sensor.

4. The method of claim 3, wherein positions of features of the environment are binary encoded within the current evidence grid.

5. The method of claim 3, wherein positions of features of the environment are probabilistically encoded within the current evidence grid.

6. The method of claim 1, wherein correlating the current evidence grid against a historical evidence grid comprises performing one or more translations or rotations to identify a matching position based on when the current evidence grid and the historical evidence grid are maximally correlated.

7. The method of claim 1, wherein creating the current evidence grid comprises:
    scanning the environment with a sensor; and
    encoding a set of data received from the sensor within an evidence grid.

8. The method of claim 1, wherein scanning the environment with a sensor comprises performing a plurality of scans of the current environment.

9. The method of claim 1, wherein correlating the current evidence grid against a historical evidence grid further comprises:
    identifying a neighborhood of possible evidence grid translations and rotations, wherein the neighborhood defines a range of translations and rotations through which the current evidence grid and the historical evidence grid are translated and rotated; and
    translating and rotating the current evidence grid and the historical evidence grid within the neighborhood.

10. The method of claim 1, further comprising:
    transmitting a displacement record to a Kalman filter, wherein the displacement record contains the displacement information; and
    updating a navigation processor with information received from the Kalman filter, wherein the navigation processor receives motion information from an inertial measurement unit and provides a navigation solution for a navigation system.

11. A system for correcting errors in an inertial navigation system, the system comprising
    a navigation processor configured to provide a navigation solution;
    a sensor configured to scan an environment
    an evidence grid creator configured to create a current evidence grid based on data received from the sensor and the navigation solution, wherein an evidence grid represents a collection of cells in the environment, where each cell has a probability that the cell is occupied by a feature in the environment;

a correlator configured to correlate the current evidence grid against a historical evidence grid stored in memory to find a matching position and produce displacement information, wherein the correlator performs one or more translations or rotations to align the current evidence grid and the historical evidence grid; and a measurement unit configured to correct the navigation solution based on the displacement information.

12. The system of claim 11 further comprising a Kalman filter configured to update the navigation solution.

13. The system of claim 11, further comprising a neighborhood identifier configured to identify a neighborhood of possible evidence grid translations and rotations, wherein the neighborhood defines a range of translations and rotations through which the current evidence grid and the historical evidence grid are to be translated and rotated.

14. A system for using cross-correlated evidence grids to acquire navigation information, the system comprising:

a navigation processor coupled to an inertial measurement unit, the navigation processor configured to generate a navigation solution;

a sensor configured to scan an environment;

an evidence grid creator coupled to the sensor and the navigation processor, wherein the evidence grid creator is configured to generate a current evidence grid based on data received from the sensor and the navigation solution, wherein an evidence grid represents a collection of cells in the environment, where each cell has a probability that the cell is occupied by a feature in the environment;

a correlator configured to correlate the current evidence grid against a historical evidence grid stored in a memory to produce displacement information, wherein the correlator performs one or more translations or rotations to align the current evidence grid and the historical evidence grid; and where the navigation processor receives correction data derived from correlation of evidence grids and adjusts the navigation solution based on the correction data.

15. The system of claim 14, wherein the evidence grid creator is further configured to mark voxels of the current evidence grid to represent features of the environment captured by the sensor.

16. The system of claim 15, wherein the evidence grid creator encodes positions of features of the environment with a binary encoding within the current evidence grid.

17. The system of claim 15, wherein the evidence grid creator encodes positions of features of the environment with a probabilistic encoding within the current evidence grid.

18. The system of claim 14, wherein the correlator performs one or more translations or rotations to identify a matching position based on when the current evidence grid and the historical evidence grid are maximally correlated.

19. The system of claim 14, wherein the historical evidence grid is generated from one or more previous current evidence grids.

20. The system of claim 14, wherein the evidence grid creator uses a plurality of scans of the scanned environment to create the evidence grid of the scanned environment.

* * * * *